(12) United States Patent
Chang et al.

(10) Patent No.: US 9,090,476 B2
(45) Date of Patent: Jul. 28, 2015

(54) DIRECT DEPOSITION OF GRAPHENE ON SUBSTRATE MATERIAL

(76) Inventors: Chun-Chieh Chang, Ithaca, NY (US); Tsun-Yu Chang, Taichung (TW)

(*) Notice: Subject to any disclaimer, the term of this patent is extended or adjusted under 35 U.S.C. 154(b) by 527 days.

(21) Appl. No.: 13/427,044

(22) Filed: Mar. 22, 2012

(65) Prior Publication Data

US 2013/0251888 A1    Sep. 26, 2013

(51) Int. Cl.
| | |
|---|---|
| *B05D 1/00* | (2006.01) |
| *C01B 31/04* | (2006.01) |
| *B82Y 40/00* | (2011.01) |
| *C04B 35/628* | (2006.01) |
| *B82Y 30/00* | (2011.01) |

(52) U.S. Cl.
CPC ............ *C01B 31/0446* (2013.01); *B82Y 30/00* (2013.01); *B82Y 40/00* (2013.01); *C04B 35/62839* (2013.01); *C04B 2235/3203* (2013.01); *C04B 2235/3268* (2013.01); *C04B 2235/3272* (2013.01); *C04B 2235/3275* (2013.01); *C04B 2235/3279* (2013.01); *C04B 2235/447* (2013.01)

(58) Field of Classification Search
CPC .. H01M 200/0094; Y02E 60/122; B05D 1/00
USPC ......... 427/359, 476, 105, 230, 122, 181, 242, 427/231, 194, 172, 183, 469, 474, 71, 72, 427/180, 239, 2.18, 240, 11, 115; 429/209
See application file for complete search history.

(56) References Cited

U.S. PATENT DOCUMENTS

| | | | |
|---|---|---|---|
| 2,817,604 A * | 12/1957 | Louis | ............................ 427/108 |
| 6,514,640 B1 | 2/2003 | Armand et al. | |
| 6,702,961 B2 | 3/2004 | Barker et al. | |
| 6,723,470 B2 | 4/2004 | Barker et al. | |
| 6,815,122 B2 | 11/2004 | Barker et al. | |
| 6,855,273 B2 | 2/2005 | Ravet et al. | |
| 6,884,544 B2 | 4/2005 | Barker et al. | |
| 6,913,855 B2 | 7/2005 | Stoker et al. | |
| 6,962,666 B2 | 11/2005 | Ravet et al. | |
| 7,344,659 B2 | 3/2008 | Ravet et al. | |
| 7,457,018 B2 | 11/2008 | Armand et al. | |
| 7,494,744 B2 | 2/2009 | Chang | |
| 7,585,593 B2 | 9/2009 | Chang | |
| 7,629,084 B2 | 12/2009 | Chang | |
| 7,718,320 B2 | 5/2010 | Chang | |

(Continued)

FOREIGN PATENT DOCUMENTS

| | | | |
|---|---|---|---|
| JP | 2006-317167 | * | 11/2006 |
| WO | 2007064934 A2 | | 6/2007 |
| WO | 2007064934 A3 | | 5/2008 |

OTHER PUBLICATIONS

Becerril, et al., Evalution of Solution-Processed Reduced Graphene Oxide Films as Transparent Conductors, ACSNANO, Feb. 2008, 463-470, vol. 2, No. 3, ACSNANO.

(Continued)

*Primary Examiner* — Michael Cleveland
*Assistant Examiner* — Tabassom Tadayyon Eslami
(74) *Attorney, Agent, or Firm* — Thomas | Horstemeyer, LLP

(57) ABSTRACT

In one embodiment, a method comprising causing motion of an enclosed container comprising substrate material and graphite material within the container; and coating surfaces of the substrate material with the graphite material responsive to the motion of the container, the coated surfaces comprising graphene or graphene layers.

20 Claims, 11 Drawing Sheets

(56) References Cited

U.S. PATENT DOCUMENTS

| | | |
|---|---|---|
| 7,988,941 B2 | 8/2011 | Choi et al. |
| 2005/0244321 A1 | 11/2005 | Armand et al. |
| 2007/0031732 A1 | 2/2007 | Chiang et al. |
| 2009/0239151 A1* | 9/2009 | Nakanishi et al. ....... 429/231.95 |
| 2010/0047154 A1 | 2/2010 | Lee et al. |
| 2010/0081057 A1 | 4/2010 | Liu et al. |
| 2010/0247801 A1 | 9/2010 | Zenasni |
| 2010/0266964 A1 | 10/2010 | Gilje |
| 2011/0111299 A1 | 5/2011 | Liu et al. |
| 2011/0114499 A1 | 5/2011 | Hori et al. |
| 2011/0114919 A1 | 5/2011 | Jenkins et al. |
| 2011/0143034 A1 | 6/2011 | Ahn et al. |
| 2011/0186786 A1 | 8/2011 | Scheffer et al. |
| 2011/0189406 A1 | 8/2011 | Cho et al. |
| 2011/0189452 A1 | 8/2011 | Lettow et al. |
| 2011/0210293 A1 | 9/2011 | Liang et al. |
| 2011/0240947 A1 | 10/2011 | Yang et al. |
| 2011/0268647 A1 | 11/2011 | Ivanovici et al. |

OTHER PUBLICATIONS

Chen et al., Mechanically Strong, Electrically Conductive, and Biocompatible Graphene Paper, Advanced Materials, Jul. 2008, 3557-3561, vol. 20, Wiley InterScience.

Dikin et al., Preparation and characterization of graphene oxide paper, Nature, Jul. 26, 2007, 457-460, vol. 448, Nature Publishing Group.

Edman et al., Electrical resistivity of single-crystal graphite under pressure: An anisotropic three-dimensional semimetal, Mar. 15, 1998, 6227-6230, vol. 57, No. 11, The American Physical Society.

Si et al., Synthesis of Water Soluble Graphene, Nano Letter, Apr. 30, 2008, 1679-1682, vol. 8, Dept. of Chemistry, University of North Carolina at Chapel Hill, Chapel Hill, North Carolina U.S.

U.S. Appl. No. 13/453,005, filed Apr. 23, 2012 entitled "Direct Synthesis of Lithium Ion Battery Electrode Materials Using Graphene Treated Raw Materials as the Reactant".

\* cited by examiner

DIRECT DEPOSITION OF GRAPHENE ON SUBSTRATE MATERIAL

TECHNICAL FIELD

The present disclosure is generally related to graphene production.

BACKGROUND

A crystal structure of graphite is shown in FIG. 1. The structure can be properly described using the space group of $P6_3/mmc$, and its layer-structured characteristic evidenced from the depiction in FIG. 1 and conventionally known. Graphite is constructed through honeycomb-structured, carbon layers held by Van der Waals forces. Since Van der Waals forces comprise one of the weakest chemical bonding in materials, the graphite layers may be theoretically exfoliated from the graphite surface as "graphene" layers without much sacrifice or consumption of energy and work. Nonetheless, graphite has been reported as a good electrical conducting material especially in the in-plane direction (e.g., the ab plane shown in FIG. 1, 55 to 65 $\mu\Omega$ cm in resistivity) owing to the overlapping of the P orbital ($\pi$ bonding) of carbon atoms. Such features make graphene a desirable top-layer for substrate material surfaces if the electrical conductivity is important for material performance for certain applications.

In view of materials for lithium ion battery applications, electrical conductivity and lithium ion mobility largely determine the performance (e.g., rate capability or C-rate) of the material. Conventionally, carbon black (e.g. acetylene black) is used for the enhancement of electrical conductivity of the electrode containing battery active materials through mechanisms, such as addition, in the step of slurry formation during electrode processing. However, such addition mechanisms possess limited enhancement of electrode conductivity for one or a plurality of reasons. For instance, one reason may be the lack of contact between the material and the carbon black owing to the presence of binder. Another reason may be that the carbon black cannot penetrate to any place of the material, especially when material particles are small or mesoporous. Further, the high surface area nature of the carbon black makes the slurry formation procedure difficult during electrode processing.

Various conventional techniques include the incorporation of graphene with metal oxides in solution with the presence of surfactant. Indeed, this approach is somewhat similar to the techniques described above except the carbon source has been changed from carbon black to graphene. One problem with these conventional processes is that high surface area graphene layers do not adequately bond to the substrate material (e.g., metal oxide) in the solution. As a result, the adherence of graphene to the substrate material is questionable, and "free graphene" may not form proper bonding to the substrate material in the later stage (e.g. after drying or with subsequent heat treatment) or can be even present in the final product. Furthermore, the graphene in the solution may curve in the end (during drying or even in the solution) and form nanotubes that cannot form proper bonding to the substrate materials. Overall, the outcome is about the same, which is a drastic increase in the surface area of the as-synthesized material. Moreover, the performance of the as-synthesized material is strongly dependent on the weight percentage of "graphene" being present in the material.

SUMMARY

In one embodiment, a method comprising causing motion of an enclosed container comprising substrate material and graphite material within the container; and coating surfaces of the substrate material with the graphite material responsive to the motion of the container, the coated surfaces comprising graphene or graphene layers.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
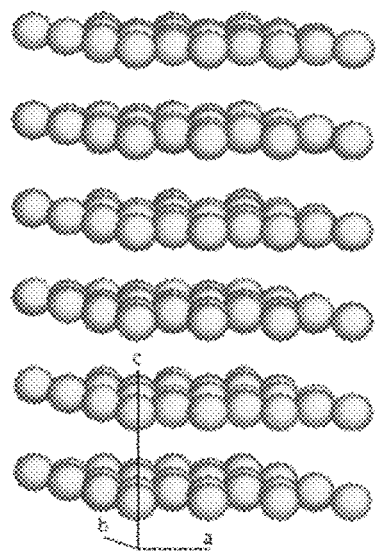
FIG. 1 is a schematic diagram depicting an example graphite crystalline structure.

Certain embodiments of an invention involving a method and apparatus for producing graphene based on mechanical mechanisms are disclosed, referred to herein collectively as graphene producing (GP) methods. In particular, certain embodiments of GP methods provide for the direct deposition of graphene or multiple graphene laters on a substrate material through mechanical mechanisms (e.g., friction-based techniques). In one embodiment, a graphite cylinder is rotated, shaken, or otherwise placed in motion to enable frictional contact between a substrate material and the graphite material of the inner surface of the cylinder, resulting in the substrate material comprising a coating of (a) graphene layer(s). Reference herein to "coating" or the like includes, in one embodiment, the formation of a contiguous, graphene monolayer on one or more external surfaces of a material substrate. In some embodiments, reference to "coating" or the like includes the formation of a discontiguous, graphene layer(s) on one or more external surfaces of a material substrate, or stated otherwise, the formation of a graphene layer(s) in a select portion of a given external surface or multiple graphene monolayers in respective selected portions of a given external surface of the substrate materials, hence resulting in one or more gaps, for instance, in one of the external surfaces of the substrate material where a graphene layer(s) is not present in the gap(s).

Note that in some embodiments, multiple, non-overlapping graphene layers may be produced on a given substrate surface, or in some embodiments, multiple overlapping layers may be produced on a given substrate surface. In some embodiments, there may be multiple single layers peeled off from the source (e.g., a hollow cylinder, member, etc.).

In contrast to conventional systems and methods, certain embodiments described herein reduce or eliminate the need for exfoliation techniques or other methods of extracting graphene from a crystalline composition. For instance, certain embodiments of GP methods eliminate or significantly mitigate the need for special (e.g., other than room) temperatures, pressures, solutions, solvents, precursors, and/or atmospheric conditions (e.g., select gases), and further eliminate or significantly mitigate the need for conventional post-processing, such as drying, evaporation, exfoliation, etc.

Having summarized certain features and/or benefits of one or more embodiments of GP methods of the present disclosure, reference will now be made in detail to the description of the disclosure as illustrated in the drawings. While the disclosure will be described in connection with these drawings, there is no intent to limit it to the embodiments disclosed herein. Further, although the description identifies or describes specifics of one or more embodiments, such specifics are not necessarily part of every embodiment, nor are all various stated advantages necessarily associated with a single embodiment or all embodiments. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 2:
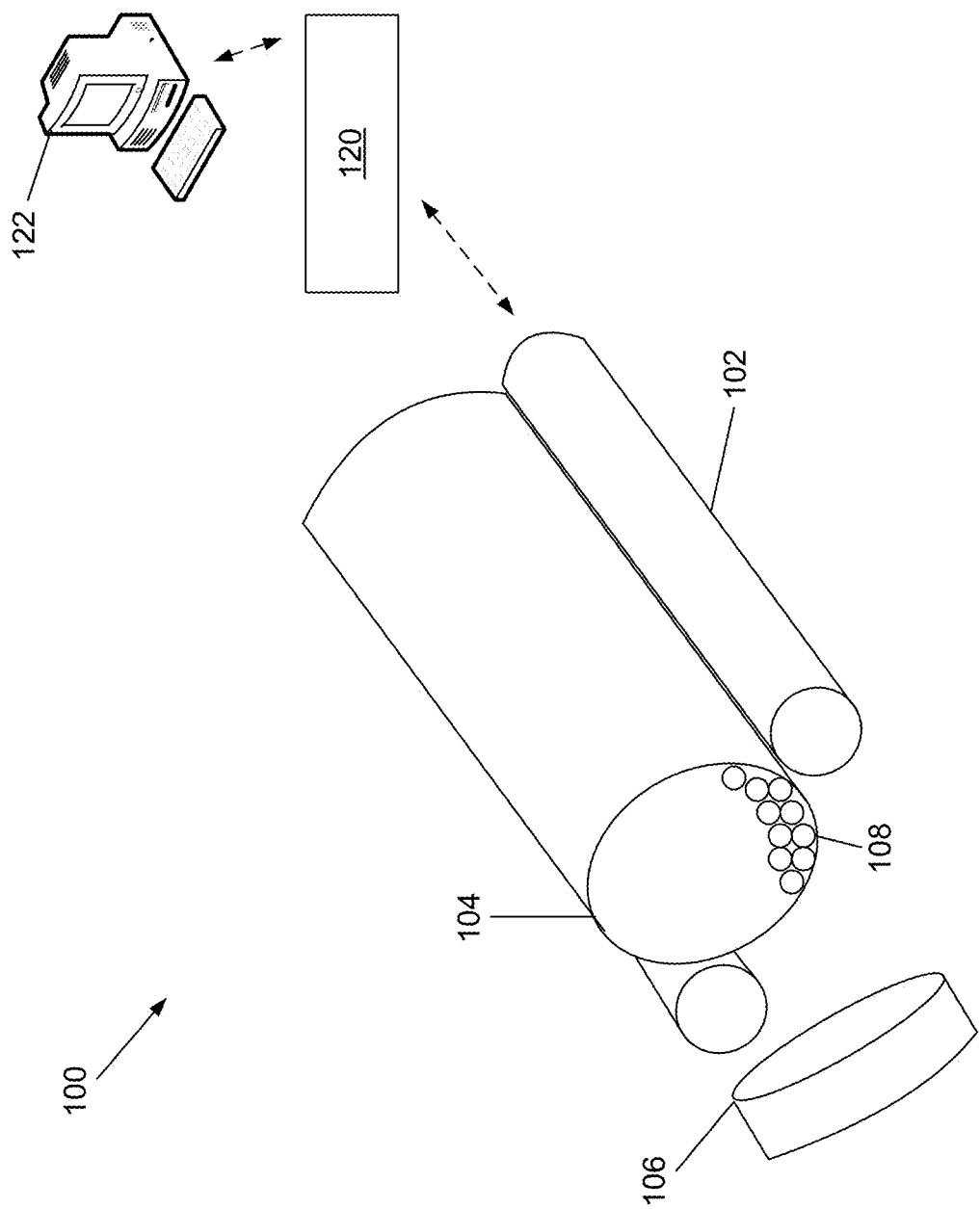
FIG. 2 is a block diagram depicting one embodiment of an example mechanical apparatus and associated method for producing graphene.

Digressing briefly, if a graphite single crystal is aligned as shown in FIG. 1, and if the substrate material is forced to pass through the top graphite layer, the substrate material is coated with the top layer of the graphite through friction force. In other words, if the graphene sources (e.g. hollow cylinder or solid cylinder surfaces) are made of graphite particles aligned along the c-axis, performance is improved. However, in general, single crystal graphite is not readily available. Accordingly, certain embodiments as disclosed herein provide various approaches to enabling the frictional contact between the substrate material and graphite material to produce graphene while overcoming the inherent difficulties associated with producing single crystal graphite. Referring to FIG. 2, shown are certain portions of an example apparatus that illustrate one embodiment of a GP method. One having ordinary skill in the art should appreciate in the context of the present disclosure that the example apparatus is merely for illustrative purposes, with other variations contemplated to be within the scope of the disclosure. As shown in FIG. 2, an apparatus 100 comprises one or more shafts, such as shaft 102, that is coupled to a motor 120, the shaft 102 engaged (e.g., fixed or detachably connected or coupled) to a container 104 by known fastening mechanisms. The motor 120 may further be operatively coupled (e.g., wireless or wired) to a computing device, such as computer 122. The computer 122 may be used to control the motor 120 and hence motion (e.g., duration of the motion, speed or manner of agitation, etc.). In some embodiments, control of the motor 120 may be integral to the motor. Note that the shaft and container and motor is also referred to herein as an assembly, and that in some embodiments, the assembly may comprise different sources of motion (e.g., a planetary mixer, tumbler, shaker, centrifuge, among others). In other words, any mechanism or apparatus known in the art to cause motion of the contents in the container 104 may be used, and hence any depiction or description of a particular apparatus is for illustrative, not limiting purposes. In some embodiments, the shaft 102 and container 104 may be an integral unit, or the container 104 may be removable, or the shaft 102 and container 104 may be part of a larger assembly. For instance, the container 104 may be embodied as a tube or chamber disposed in a platform of a planetary mixer or other mechanical device, the tube disposed in the platform among other tubes.

In the depicted embodiment, the container 104 is embodied as a hollow cylinder composed of graphite material, though other geometries are contemplated to be within the scope of the disclosure. In some embodiments, the graphite material may be disposed only on the inner surface of the container 104, where the outer surface is comprised of a different material (e.g., a plastic-based material, metal material, glass, etc.). Note that, as is true with all containers described herein, the container may be disposed within a chamber of a given motion-causing apparatus, or may be integral to the actual apparatus. Further, there is no intent to limit the container in size, such that a plurality of different-sized containers is contemplated to be within the scope of the disclosure. Further, movement caused by the motor(s) 120 (or other device(s) in some embodiments) may include rotational movement (e.g., along a single axis), tumbling movement (e.g., along multiple axes of rotation), and/or shaking movements, among others as should be understood by those having ordinary skill in the art.

The container 104 comprises a removable lid 106, which serves to fully enclose (at least temporarily) the container 104 and hence constrain movement of substrate material 108 (and member(s) where used, as explained below), deposited or otherwise disposed internally to the container 104, to the interior boundaries of the container during motion. The substrate material 108 includes one of a plurality of different types of substrate material, such as metals, semiconductors, plastics, ceramics, or a combination of two or more of these or other materials.

In operation, and referring still to FIG. 2, the motor 122 (e.g., under control of the computer 122) causes motion of the container 104, such as a tumbling motion. Responsive to this motion, the substrate material 108 is caused to come into frictional contact with the graphite particles of the inner surface of the hollow cylinder 104, resulting over time in the coating of the substrate material 108 with the graphite particles of the inner surface of the container 104 in the form of a single atomic layer or graphene (or graphene layers). Such operation may occur (as is also true in the embodiments that follow) under standard room temperatures and pressures and atmospheric conditions, without the introduction of solutions/solvents and/or post-processing activities (e.g., exfoliation, drying, etc.).

Figure 3:
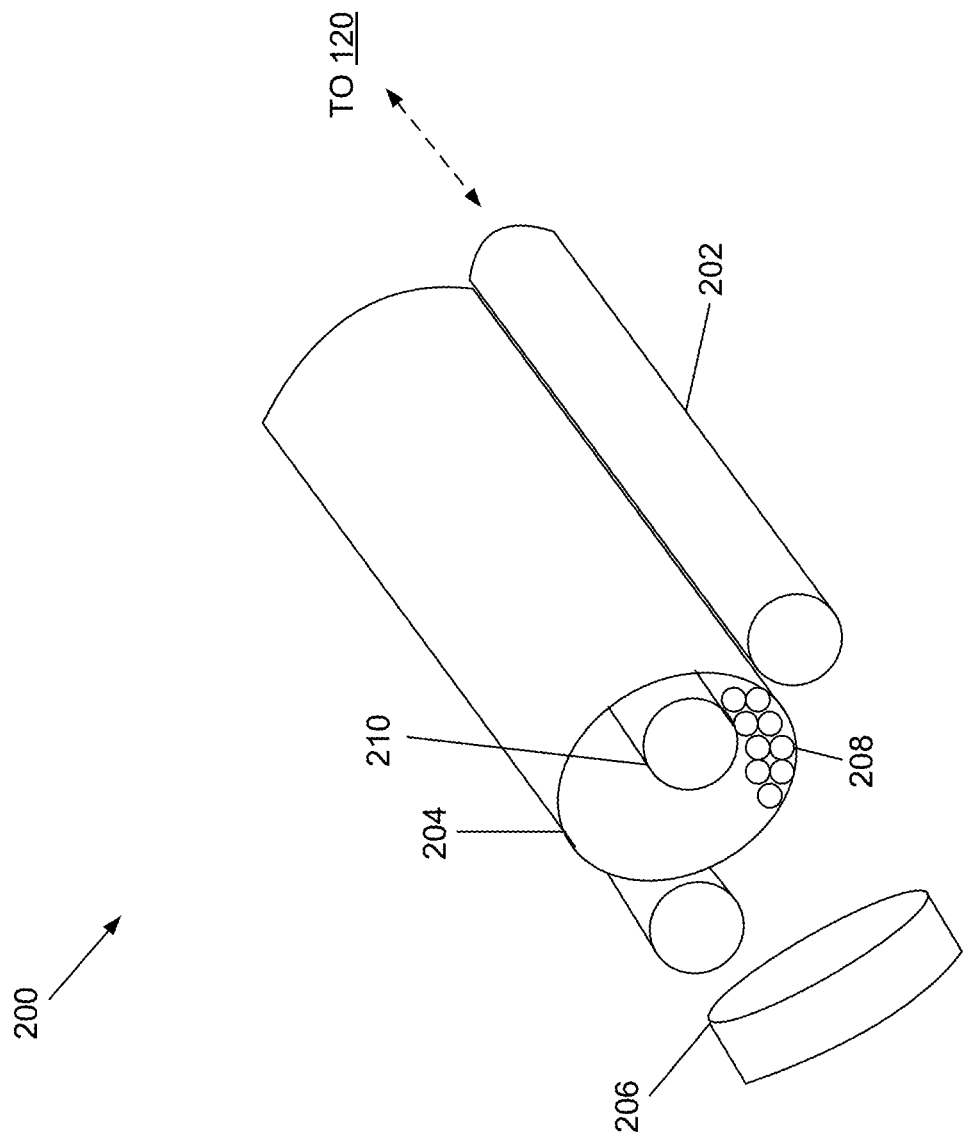
FIG. 3 is a block diagram depicting another embodiment of an example mechanical apparatus and method for producing graphene.

In another embodiment, and referring to FIG. 3, an apparatus 200 is depicted, including a shaft 202, container 204, lid 206, and substrate material 208. The motor 120 and computer 122 are omitted for purposes of brevity, though understood to be present in these and/or one or more other embodiments to follow. The shaft 202, lid 206, and substrate material 208 are similar to that described in association with FIG. 2, and hence discussion of the same is omitted here for brevity. The container 204 may be embodied as a hollow graphite cylinder, similar to that described in association with FIG. 2, or as a container of a different form (e.g., a jar) and/or material (e.g., glass, plastic etc.). In the depicted embodiment (FIG. 3), the container 204 is composed of non-graphite material. Also shown is a member 210 placed (loosely) upon or otherwise disposed within (e.g., affixed to an inner surface) the container 204. The member 210 may be embodied as a solid graphite bar (or comprised in part of graphite at the surface), a hollow cylinder composed of graphite (or at least composed in part of graphite, such as at the surface), among other geometries (e.g., graphite strips, graphite tiles, etc.). In the GP method embodiment illustrated in FIG. 3, the member 210 serves as the graphene source, as it is placed in this depicted example on top of the substrate material 208. Responsive to motion (based on the motor 120 engaging the shaft 202 to cause the container 204 to tumble or otherwise move along one or more axes), the substrate material 208 comes into frictional contact with the graphite surfaces of the member 210, resulting in a coated substrate material (e.g., coated with graphene or graphene layers). In some embodiments, the configuration of the member 210 and/or container 204 with graphite particles aligned along the c-axis (see FIG. 1) may enable improved performance (e.g., continuity (contiguity), density, etc.). Further, note that in some embodiments, the container 204 may be composed of graphite material (e.g., thoroughly, or at least on the inner surfaces), and hence serve along with the member 210 as a source of the graphene.

Figure 4:
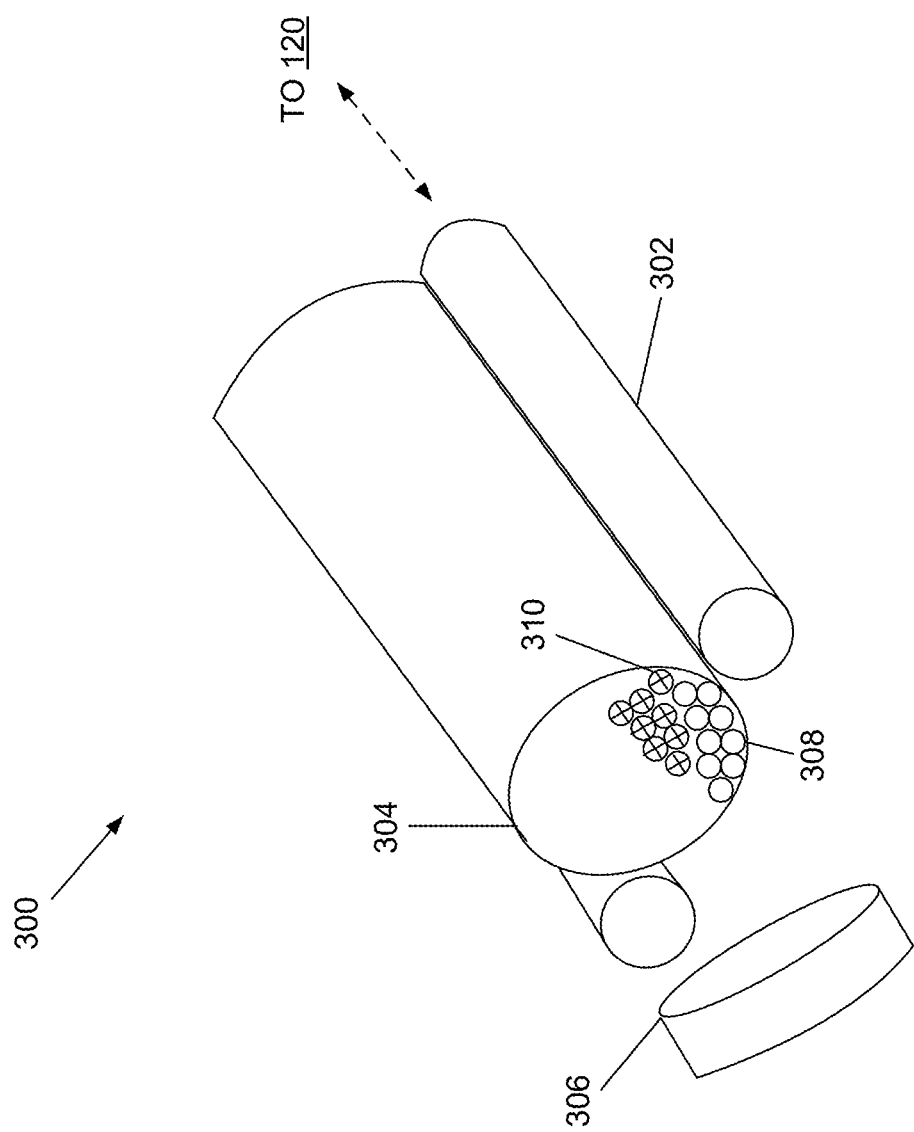
FIG. 4 is a block diagram depicting another embodiment of an example mechanical apparatus and method for producing graphene.

Another GP method embodiment is illustrated in association with the apparatus 300 of FIG. 4, which shows a shaft 302, container 304, lid 306, and substrate material 308 similar to that described above in association with FIGS. 2-3. Also introduced in FIG. 4 are members 310 embodied in the form of graphite balls (depicted in FIG. 4 with an "x" within each of the balls to distinguish from the substrate material 308). As noted above, members 210 (and 310) may be embodied in one of a plurality of geometries (or a mix of different geometries), including in solid form or hollow form (or a mix of both). In the embodiment depicted in FIG. 4, the members 310 are a source of graphene, though in some embodiments, the inner surface of the container 304 may also provide a source of graphene in some embodiments. In operation, the motion of the container 304 (e.g., based on the motor 120 driving the shaft 302) causes the members 310 (e.g., graphite balls) in the container 304 to come in frictional contact with the substrate material 308, thus coating the surfaces of the substrate material 308 with graphene.

Figure 5:
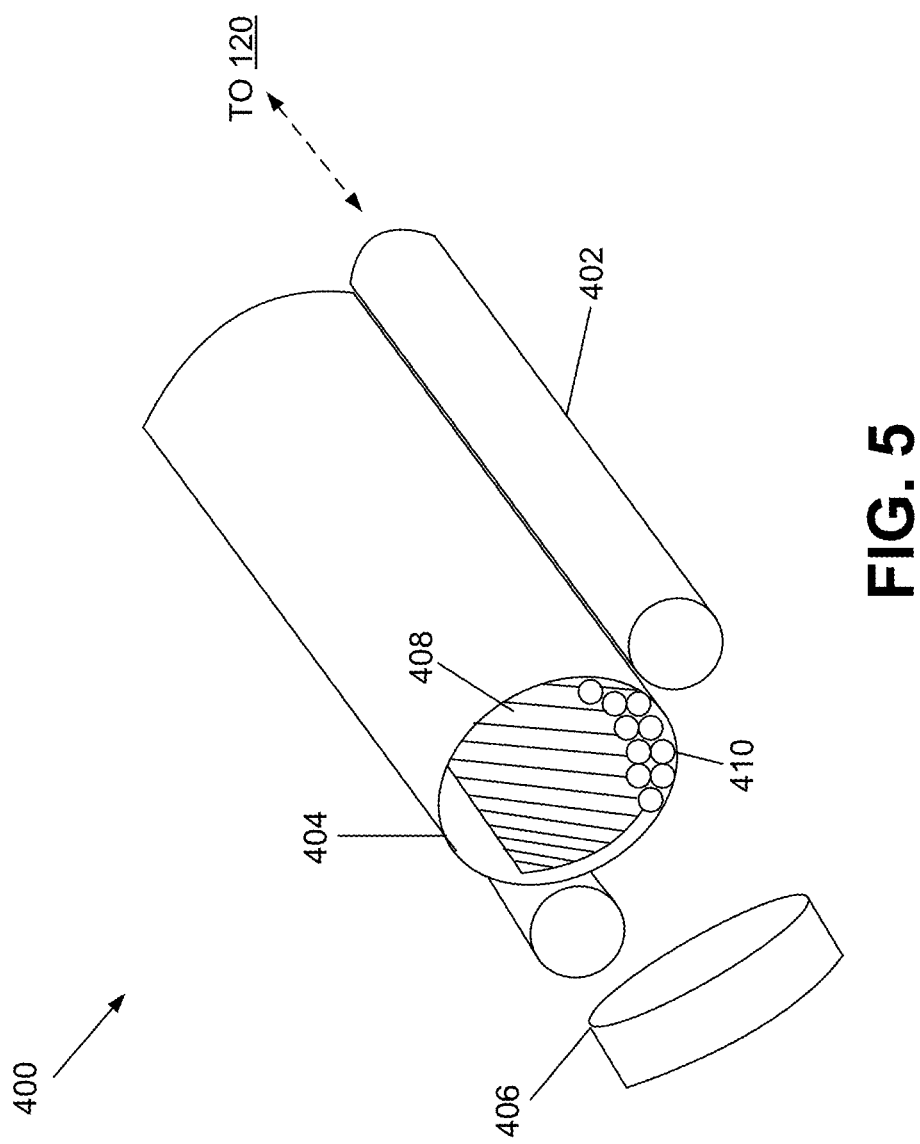
FIG. 5 is a block diagram depicting another embodiment of an example mechanical apparatus and method for producing graphene.

Referring to FIG. 5, shown is an apparatus 400 which serves to illustrate yet another GP method embodiment. The apparatus 400, similar to the apparatus 300 of FIG. 3, comprises a shaft 402 (powered by the motor 120), container 404, lid 406, substrate material 408, and one or more members 410. As with all of the containers described herein, the container 404 may be embodied in one of a plurality of different forms, such as a hollow graphite cylinder, or non-graphite material in cylindrical or other geometrical forms. In the embodiment depicted in FIG. 5, the substrate material 408 is embodied as a film material, and the members 410 are embodied as graphite powder. The film material 408 may include one a plurality of types of films, such as transparent film (e.g., polyethylene terephthalate, PET, among others) or films made of other polymers (e.g. Polyethylene PE, polypropylene PP, Poly(1,4-butylene terephthalate PBT)) or even glass substrate or glass fibers and films. In operation, the members 410 (e.g., graphite powder) are placed on top (though not limited to this top placement) of the substrate material 408 (e.g., PET film). After rotating (or otherwise causing motion of) the container 404, the graphite powder 410 comes in contact with the film 408, resulting in the coating of the film with a graphene layer on the surface (e.g., the top).

It should be understood within the context of the present disclosure that the different GP method embodiments described above may be combined. In addition, it should be understood within the context of the present disclosure that the various apparatuses and/or assemblies depicted in FIGS. 2-4 are for illustration, and not intended to limit the GP method embodiments to any particular form or design of the apparatuses or facilities involved in performing the GP methods. Also, although certain examples were given for substrate material, the substrate material is not limited to materials of any particular composition or any particular form.

Having described certain GP methods, some examples follow that further illustrate certain embodiments. Once again, the examples are for illustrative, non-limiting purposes. In a first example, referred to herein as "Example 1," the resistance of an alumina ball(s) is recorded in Table I below, before and after being coated, with graphene, the coating implemented according to an embodiment of a GP method (e.g., such as depicted in FIG. 2).

TABLE I

| No. of balls | BEFORE COATING | | | AFTER COATING | | | Process Time (hr) |
|---|---|---|---|---|---|---|---|
| | Wt (g) | Dia (mm) | Resistance (m'Ω) | Wt (g) | Dia (mm) | Resistance (m'Ω) | |
| Alum ball 1 | 17.04 | 20.83 | ∞ | — | — | 7.5 k'Ω | 24 |
| Alum ball 1 | — | — | ∞ | — | — | 2.9~5 k'Ω | 23.5 |
| Alum ball 10 | — | — | ∞ | 0.67 k'Ω 0.72 k'Ω 1.15 k'Ω 3.83 k'Ω 1.1 k'Ω | 2.37 k'Ω 10.1 k'Ω 7.7 k'Ω 0.65 k'Ω 1.8 M'Ω | | 24 |

Figure 6:
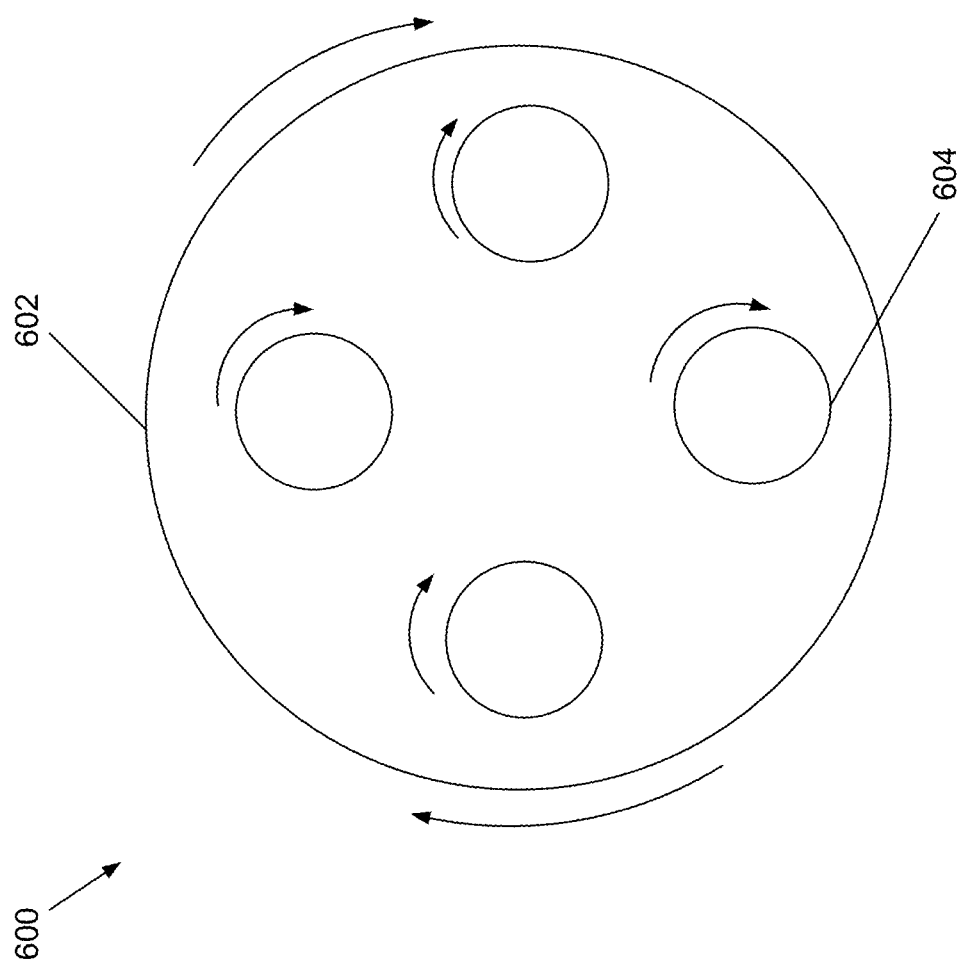
FIG. 6 is a block diagram depicting a portion of an example planetary mixer used for producing, by a given method embodiment, graphene in an example experiment.

For Example 1, a planetary mixer was utilized, such as embodied in the design of FIG. 6. In particular, FIG. 6 shows a portion of a planetary mixer 600 comprising a platform or main rotating plate 602 that carries one or more (e.g. four in this example) sample chambers (e.g., tubes, such as steel (e.g., stainless steel)), such as sample chamber 604 (the sample chamber 604 comprising a container (e.g., container 104) disposed within the tubes), rotating independently of, or not synchronized with, the rotating speed of the main rotating plate 602. In some embodiments, the chamber itself may serve as the container 104 (or other containers 204, 304, etc.). For instance, a very large mixer may be used, where the inner wall of the chamber may be covered with graphite strips or graphite tiles. In such an implementation, the mixer may be significantly larger (e.g., without the constraints of the size of a graphite cylinder). As explained previously, the container size or environment where implemented is not limited to suitability with or integration with a planetary mixer, and hence may be disposed in or integral to any apparatus that causes motion to enable friction contact between substrate material and graphite material. The samples contained in the sample chambers 604 may be subjected to centrifugal forces created by the rotation of the main rotating plate 604, and the samples may move inside the sample chamber (e.g., mixing or otherwise coming into frictional contact with each other) when sample chambers 604 are rotating independently. As should be understood by one having ordinary skill in the art, the main rotating plate 602 may be oriented either vertically or horizontally. In the depicted example, the planetary mixer 600 is oriented vertically (e.g., the main rotating plate 602 is vertical).

Figure 7:
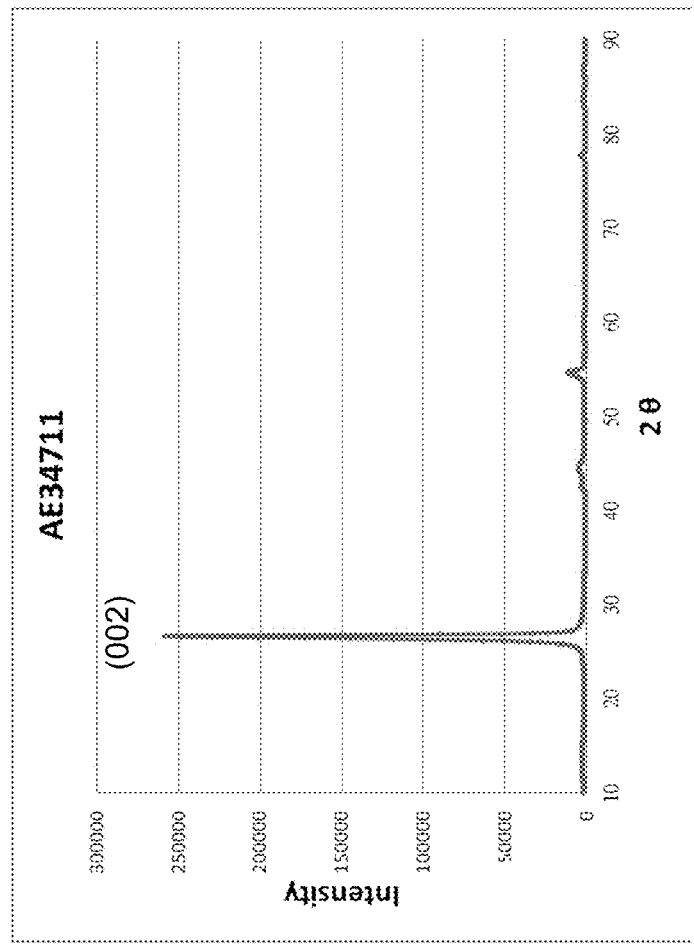
FIG. 7 is a plot diagram depicting an example X-ray diffraction (XRD) characterization of a graphite powder.

As noted in Table I, a substrate material comprising one (1) to several (e.g., ten (10)) alumina balls (e.g., diameter 20.83 mm) were placed in different sample chambers 604 that contained graphite powders as the member (e.g., member 210, 310, 410) contained therein. The graphite powders were characterized using X-ray diffraction (XRD) before being used for this experiment, as shown in the plot 700 FIG. 7, which also illustrates the strongest peak corresponding to graphite (002). Also noted by Table I is the resistance of the alumina ball before and after the graphene coating process according to a given GP method. As revealed in Table I, there is a drastic drop in surface resistance from infinite to the kilo-ohm (kn) range. Hence, it is very apparent that the alumina balls can be coated with graphene layers during this process. In other words, Example 1 conveys to an observer of the data in Table I that coating (e.g., direct deposition (bonding)) of graphene or graphene layers on the substrate material through mechanical friction is not only possible, but probable.

Figure 8B:
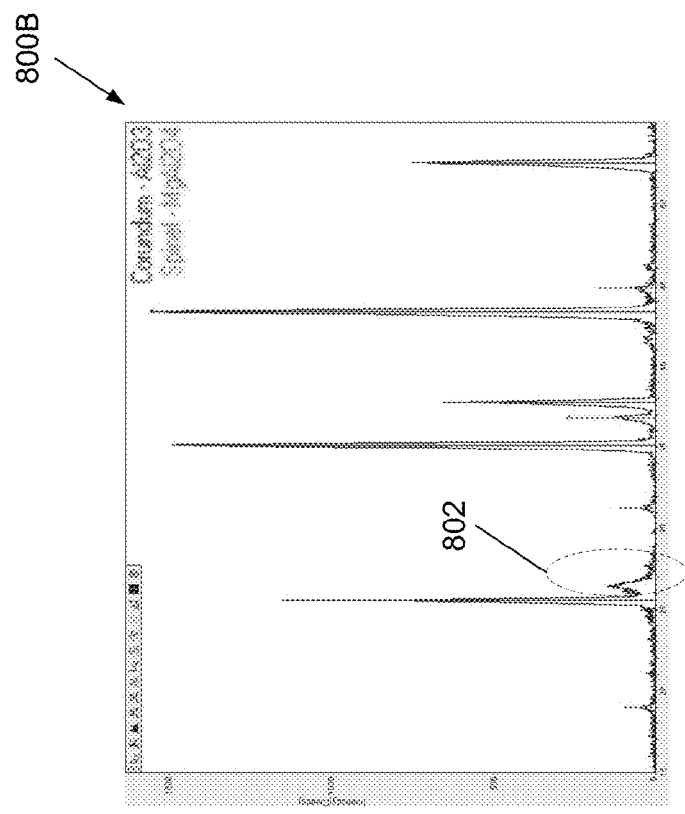
FIGS. 8A-8B are plot diagrams depicting a comparison using grazing incidence X-ray diffraction (GIXRD) of an example substrate before and after graphene coating using a particular method embodiment.
Figure 8A:
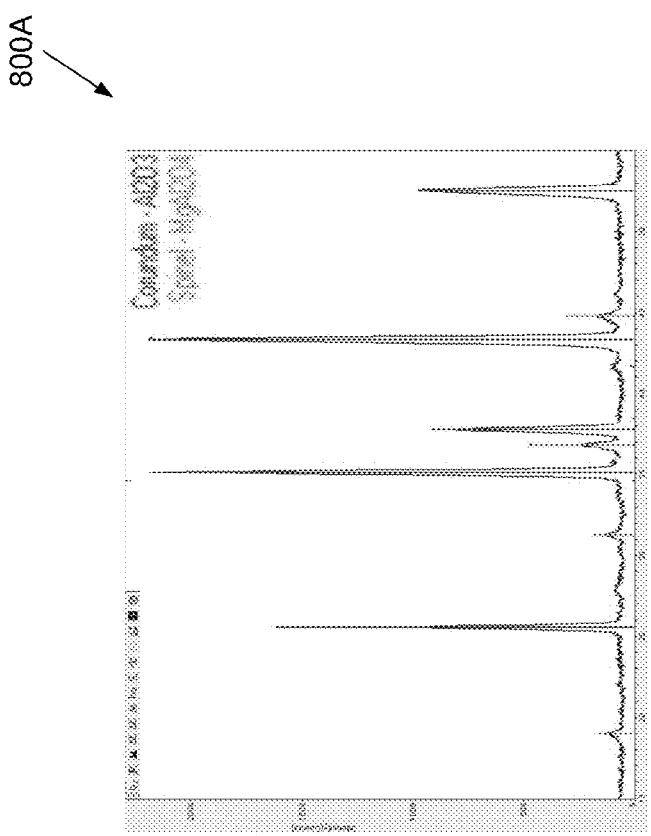

Referring to FIGS. 8A and 8B, shown are plots 800A and 800B, respectively, that compare surface diffraction characterizations (e.g., using Grazing Incidence X-ray Diffraction (GIXRD)) for the alumna balls before (FIG. 8A) and after (FIG. 8B) coating with graphene. From FIG. 8B, a broadened (002) peak as noted by reference 802 is observed, meaning very few layers of material are observed on the graphene coated sample. The broadened terminology is sometimes referred to in the art as full width at half maximum (FWHM). Additionally, the additional peaks (e.g., compared to FIG. 7) correspond to the two phases of the substrate material involved in this example, as noted in the right-hand upper corner of each plot 800A, 800B. Note that this GIXRD technique is particularly used in identifying thin film characterization. Without this technique, no peaks corresponding to graphite would have been observed.

Figure 9A:
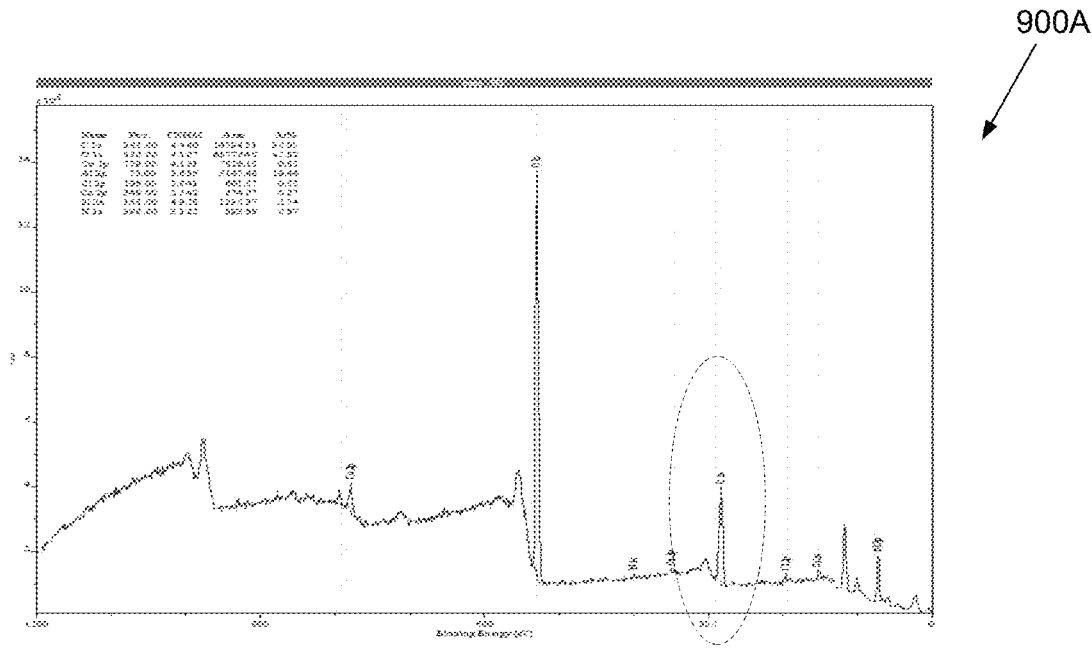
FIGS. 9A-9B are plot diagrams depicting a comparison using X-ray photoelectron spectroscopy (XPS) scans of an example material before and after graphene coating using a particular method embodiment.
Figure 9B:
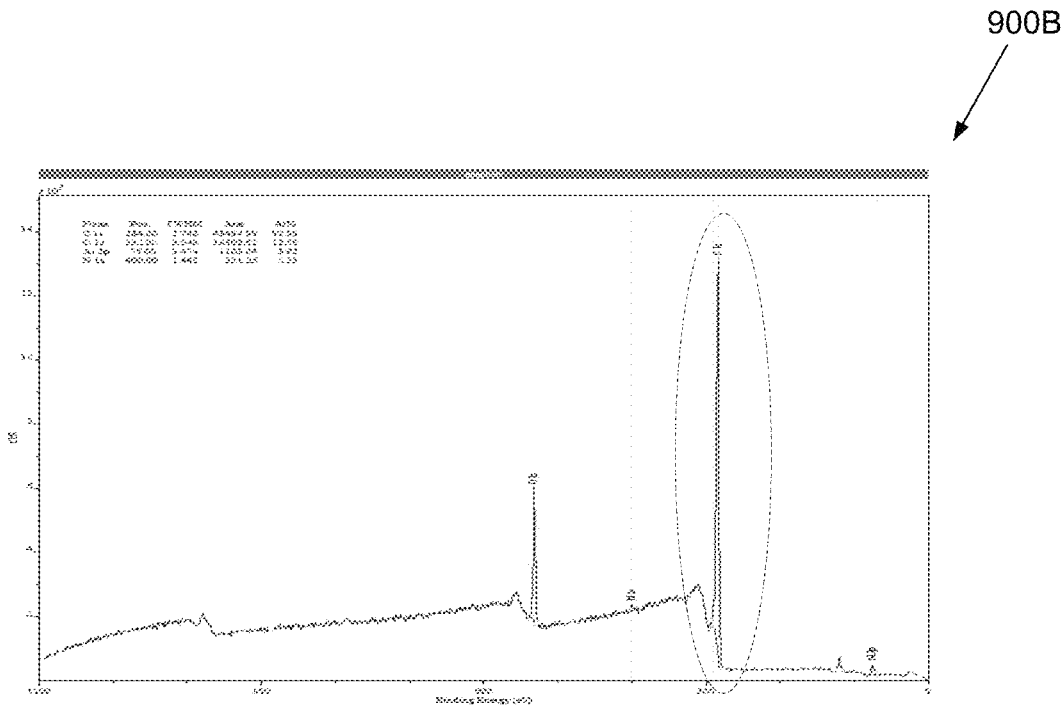

Attention is now directed to FIGS. 9A and 9B, which shows respective plots 900A and 900B revealing an X-ray photoelectron spectroscopy (XPS) scan for both the uncoated alumina ball (FIG. 9A) and the graphene coated alumina ball (FIG. 9B). It is apparent that the amount of carbon that is adhered on the surface of the alumina ball has been increased drastically during the coating procedure. All these experimental data supports the direct bonding of the graphene layer(s) to the substrate material during the graphite-substrate friction process set forth in the GP method embodiments described above.

In addition, in some embodiments, the deposition of single layer graphene or graphene layers on the substrate may be tuned by the friction force (e.g. rotating speed of the main rotating plate) and processing time as well as the particle size, shape, and texture (crystallographic orientation) of the graphite powders. In other words, tuning refers to the manner of the layer (e.g., single or multi-layer graphene) and continuity of the deposition. For instance, the larger the frictional forces, the more layers that are peeled off in the frictional contact process. As another example, the longer the duration of the process time, the more likely the substrate material (e.g., alumina ball) is fully covered (e.g., contiguous) by the graphene layer(s) (versus gaps in coverage).

Figure 10:
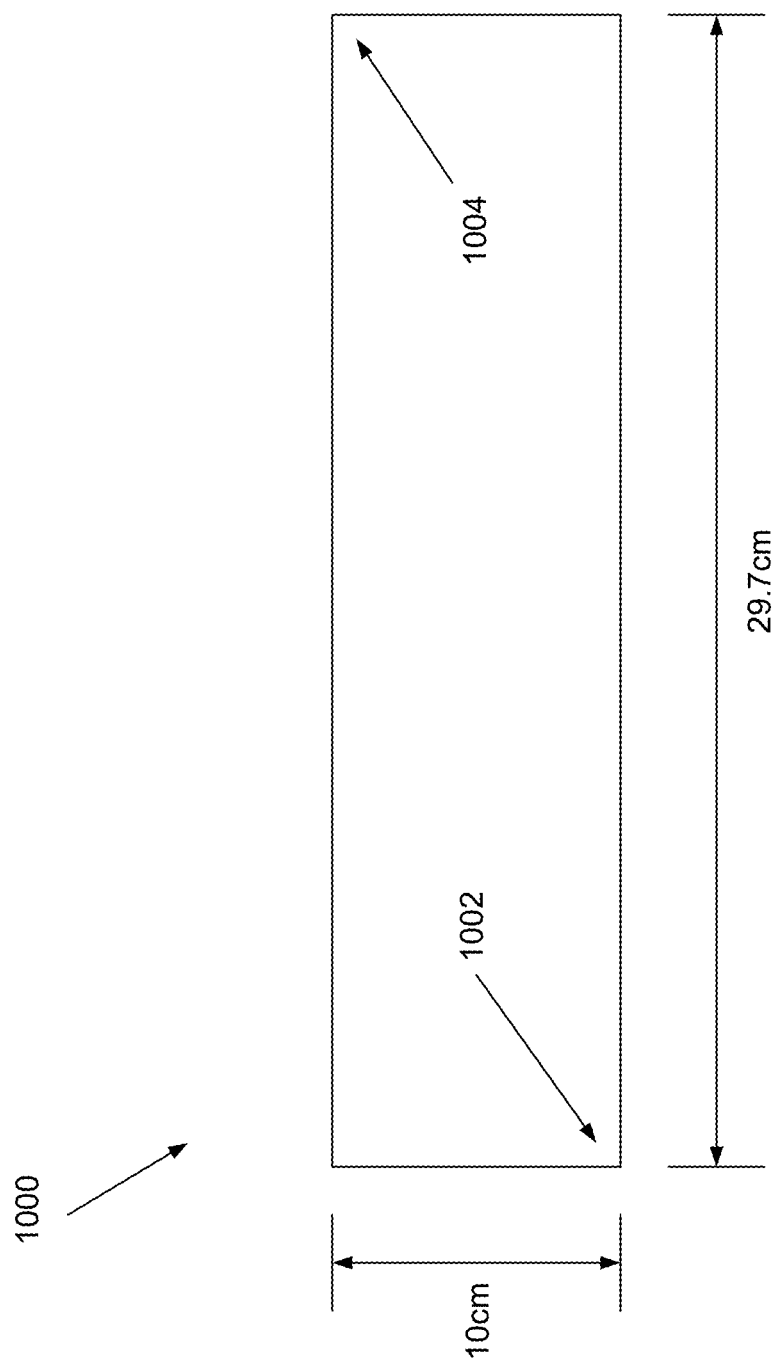
FIG. 10 is a block diagram of an example film substrate and corresponding dimensions and resistance measurement points.

Having described one example experiment that illustrates the performance achieved by certain embodiments of a GP method, attention is directed to another example, referred to herein as Example 2, which corresponds to the use of a transparent PET (Polyethylene Terephthalate) film being coated with graphene. In this experiment, the planetary mixer 600 (e.g., FIG. 6) is again used for demonstration. The PET film 1000, shown in FIG. 10, has example dimensions of 10 cm×29.7 cm, was placed in one of the chambers containing graphite powders, and has the illustrated resistance measurement points 1002 and 1004 (opposing corners along a diagonal of the film 1000). The configuration of the film and the graphite powers inside the chamber is similar to what has been shown in and described in association with FIG. 5. After two (2) hours, four (4) hours, and six (6) hours processing, the resistance of the film decreases from infinity to 34.8 MΩ (2 hours), 31.2 kΩ (4 hours), and 23.7 kΩ (6 hours) respectively. It is noteworthy that the film was transparent after six (6) hours processing and a slight metallic shiny surface was observed. Also revealed from this experiment is that mechanical friction as implemented in certain embodiments of GP methods may create graphene coating even at room temperatures.

As yet another example, referred to herein as "Example 3," a LiFePO$_4$ type of cathode material was placed in a hollow graphite cylinder, similar to the embodiment depicted in and described in association with FIG. 2. In this example, conventional LiFePO$_4$ is used for the experiment. For comparison, one sample is not treated with graphene, whereas the other sample is treated with the graphene deposition using the planetary mixer 600 (FIG. 6). In Example 3, the sample chamber 604 is replaced by a hollow graphite tube as the source of graphene. After 48 hours treatment, the material shows drastic enhancement in capacity as shown in Table II below. The battery test results shown in Table II were materials being tested under C/10 in the $1^{st}$ cycle (shown as $1^{st}$ CC, $1^{st}$ DC for $1^{st}$ charge and discharge capacity), and ~2C in the rest of the cycles (only $3^{rd}$ and $16^{th}$ cycles capacity data shown).

TABLE II

| Sample | Battery Test Results | | | | | |
| --- | --- | --- | --- | --- | --- | --- |
| No. | $1^{st}$ CC | $1^{st}$ DC | $3^{rd}$ CC | $3^{rd}$ DC | 16nd CC | 16nd DC |
| AE34751 | 119.7001 | 1.22836 | 0.948765 | 0.030904 | 0.241547 | 0.0190699 |
| AE34753 | 154.5326 | 139.1457 | 106.1305 | 105.6185 | 97.40617 | 96.44449 |

| Sample | Particle Size Analysis Results | | | | | Surface |
| --- | --- | --- | --- | --- | --- | --- |
| No. | D0 | D10 | D50 | D90 | D100 | Area BET |
| AE34751 | 0.31 | 1.03 | 2.88 | 11.89 | 28.45 | 7.9299 |
| AE34753 | 0.31 | 1.05 | 3.68 | 14.59 | 33.16 | 7.7345 |

The particle size and surface area (BET) measurement results are also shown in Table II for comparisons. It can be seen that both the particle size and BET have not changed much during the process. Since the only difference is the graphene treatment, it is apparent that the enhancement of materials capacity is caused by the deposition of graphene on the material. One important aspect that is noteworthy is that the BET has not increased much during the graphene deposition process, so it is reasonable to conclude that the graphene has been bonded to the material surface. If this is not the case, the surface area should have increased significantly (even if a small portion of graphene is present in the material) considering the theoretical surface area of graphene is 2630 $m^2/g$. It should be appreciated that, though a cathode material of $LiFePO_4$ is used in this example, the use of $LiFePO_4$ as an electrode material is not intended to be limiting. That is, certain embodiments of GP methods may utilize other electrode material as the substrate material, such as Sulfur, $Li_2S$, $LiNiO_2$, $LiCoO_2$, $LiMn_2O_4$, stoichiometric or non-stoichiometric form, pure or with dopants, single or mixed oxides, etc., among others electrode compositions known for use with lithium ion battery applications.

Another example, referred to herein as Example 4, corresponds to an experiment designed for demonstrating the use of a graphite cylinder (e.g., rod) in a container embodied as a jar that may be used for graphene deposition on the substrate material. A jar made of HDPE (10 L in volume) was used as the container and two graphite cylinders (rods, 1.55 kg each) were placed in the jar side by side. The jar is rotated by the motor, as depicted similarly in FIG. 3. Similar to the previous example, an untreated $LiFePO_4$ is used as the substrate material for the experiment. Table III below shows the results of the materials capacity and physical property evolution versus time.

TABLE III

| Sample No. | Days of Oper | Battery Test (1st cycle) | | Particle Size Analysis | | | | | Surface Area |
|---|---|---|---|---|---|---|---|---|---|
| | | 1st CC | 1st DC | D0 | D10 | D50 | D90 | D100 | BET |
| AE34731 | 0 | 70.74567 | 0.080794 | 0.31 | 1.29 | 4.50 | 15.92 | 38.45 | 7.7874 |
| AE34732 | 2.5 | 143.6745 | 125.7388 | 0.03 | 0.69 | 2.36 | 12.42 | 28.58 | 8.3829 |
| AE34733 | 5 | 145.7875 | 111.6999 | 0.03 | 0.5 | 2.05 | 12.34 | 32.98 | 8.8914 |
| AE34734 | 24 | 142.658 | 123.3664 | 0.04 | 0.12 | 1.15 | 8.13 | 28.37 | 8.8704 |

It can be seen from Table III that material capacity has been increased significantly after 60 hours treatment. Although the particle size has been decreased a little bit (e.g., with respect to D50, meaning the size of the particle at the 50% in volume), the BET has not been increased drastically even after 24 days milling. This result again supports the previous conclusion that, as the graphene peeled off from the graphite cylinder has been bonded to the material surface, this causes the enhancement of material capacity over time without the increase in materials surface area.

It should be understood that the above described embodiments may be carried out using one or more apparatuses in accordance with an entirely automated process, or in some embodiments, utilized with some assistance from a human operator. Such processing, where automated, may be controller at least in part manually or entirely (or in part) through execution by one or more processors executing instructions or code (e.g., executable code) under the auspices of an operating system (or without an operating system in some embodiments) embodied in one or more computers (e.g., computer 122) or other electronic devices (e.g., programmable logic controller, etc.). Accordingly, all or a portion of certain GP method embodiments may be implemented using the apparatuses shown and described in association with FIGS. 2-6 and controlled using hardware, software, firmware, or a combination thereof. Where the GP method embodiments are controlled according to software or firmware, such software or firmware may be stored in a memory and be executed by a suitable instruction execution system. To the extent such GP method embodiments are implemented under the control of hardware, such hardware implementations may be performed using any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 11:
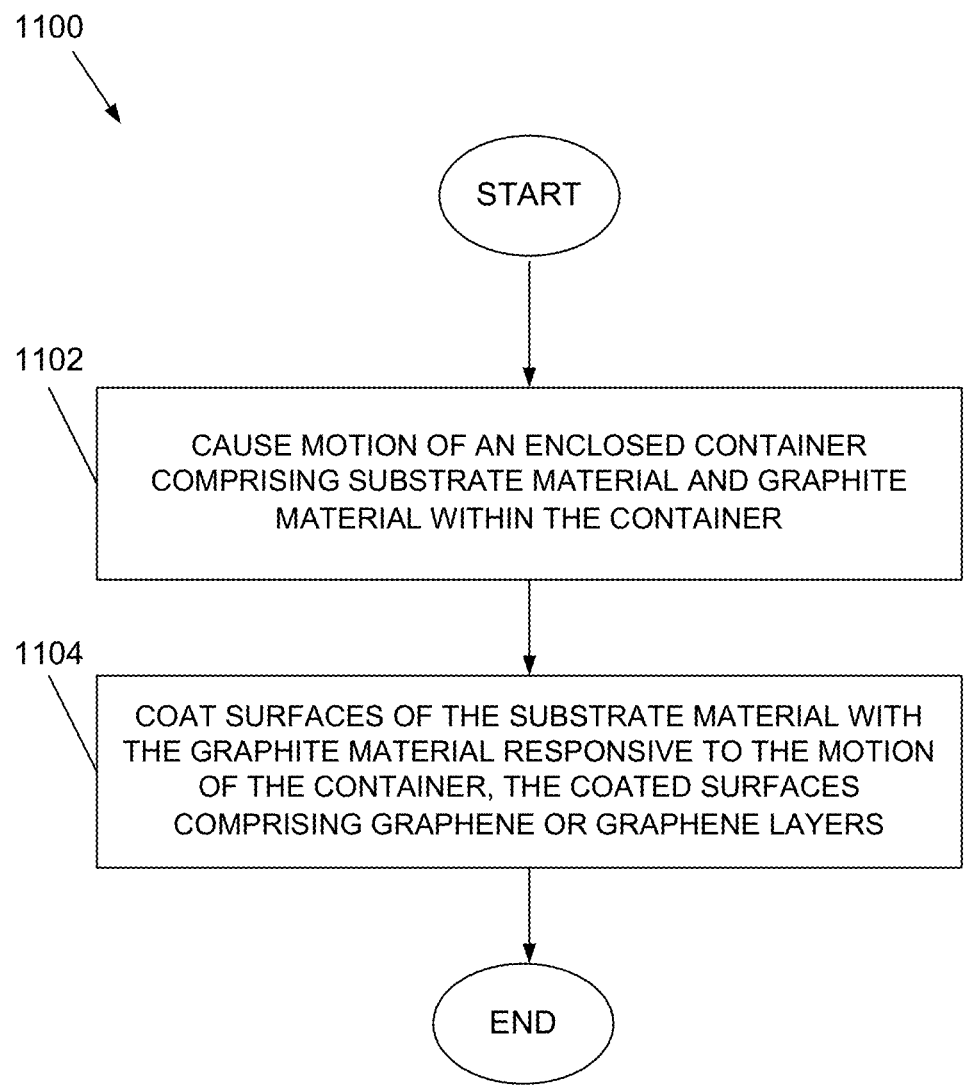
FIG. 11 is a flow diagram that depicts an embodiment of an example graphene production method.

Having described certain embodiments of GP methods, it should be appreciated that one method 1100, depicted in FIG. 11, comprises causing motion of an enclosed container comprising substrate material and graphite material within the container (1102); and coating surfaces of the substrate material with the graphite material responsive to the motion of the container, the coated surfaces comprising graphene or graphene layers (1104). The graphite material may be associated with the interior surfaces of the container in some embodiments, a member located within the interior of the container in some embodiments, or a combination of both in some embodiments.

It should be emphasized that the above-described embodiments of the present disclosure, particularly, any "preferred" embodiments, are merely possible examples of implementations, merely set forth for a clear understanding of the principles of the GP methods. Many variations and modifications may be made to the above-described embodiment(s) without departing substantially from the spirit and principles as disclosed. All such modifications and variations are intended to be included herein within the scope of this disclosure and protected by the following claims.

At least the following is claimed:
1. A method, comprising:
  causing motion of an enclosed container comprising substrate material and graphite material within the container; and
  coating surfaces of the substrate material with the graphite material responsive to the motion of the container, the coated surfaces comprising graphene or graphene layers,
  wherein the container comprises a graphite cylinder and wherein the coating is based on friction between at least the substrate material and the graphite material of an inner surface of the enclosure.
2. The method of claim 1, wherein the substrate material comprises an electrode material.

3. The method of claim 2, wherein the electrode material comprises lithium ion based electrode materials.

4. The method of claim 1, further comprising a member disposed within the container, the member having a surface composed of the graphite material, wherein the coating is further based on friction between the substrate material and the graphite material of the member.

5. The method of claim 4, wherein the member is hollow.

6. The method of claim 4, wherein the member is solid.

7. The method of claim 4, wherein the member comprises a powder.

8. The method of claim 4, further comprising one or more additional members disposed within the container, the additional members having a surface composed of the graphite material, wherein the coating is further based on friction between the substrate material and the graphite material of the one or more additional members.

9. The method of claim 4, wherein the member is ball-shaped.

10. A method, comprising:
providing an enclosed container containing substrate material and a hollow member having a surface composed of graphite material;
causing motion of the enclosed container; and
coating surfaces of the substrate material with the graphite material responsive to the motion of the container, the coated surfaces comprising graphene or graphene layers, wherein the coating is based on friction between at least the substrate material and the graphite material of the hollow member.

11. The method of claim 10, wherein the container comprises an inner surface composed of the graphite material, wherein the coating is further based on friction between the substrate material and the graphite material of the inner surface.

12. The method of claim 10, wherein the motion of the enclosed container includes shaking movements of the enclosed container.

13. The method of claim 10, wherein the motion of the enclosed container includes rotational movement of the enclosed container along one or more axes of rotation.

14. The method of claim 10, wherein the container comprises a cylindrical shape.

15. The method of claim 10, wherein the container comprises a non-cylindrical geometric shape.

16. The method of claim 10, wherein the substrate material comprises an electrode material.

17. The method of claim 16, wherein the electrode material comprises lithium ion based electrode materials.

18. The method of claim 10, wherein the substrate material is in a form of a film.

19. The method of claim 18, wherein the film comprises a polymer material.

20. The method of claim 18, wherein the film comprises a non-polymer material.

* * * * *